Patented Sept. 24, 1946

2,408,171

UNITED STATES PATENT OFFICE 2,408,171

PROCESS FOR PREPARATION OF 2-METHYL-1,2-PROPANEDIAMINE

Harold G. Johnson, Terre Haute, Ind., assignor to Commercial Solvents Corporation, Terre Haute, Ind., a corporation of Maryland No Drawing. Application July 27, 1944, Serial No. 546,935

5 Claims. (Cl. 260—583)

My invention relates to a process for the synthesis of 2-methyl-1,2-propanediamine. More particularly, it pertains to the preparation of that compound by reacting 2-methyl-2-nitro-1-propanol with ammonia and then reducing the resultant product in the presence of a suitable hydrogenation catalyst.

2-methyl-1,2-propanediamine has previously been prepared but the procedures employed are rather cumbersome and involve several operational steps before the diamine can be isolated.

I have now discovered that 2-methyl-1,2-propanediamine can be readily synthesized by first reacting 2-methyl-2-nitro-1-propanol with ammonia and then subject the product so obtained to hydrogenation in the present of a suitable hydrogenation catalyst. In its preferred embodiment, the process of my invention is effected by placing a measured quantity of 2-methyl-2-nitro-1-propanol, together with a suitable hydrogenation catalyst, into a steel hydrogenation bomb. The bomb and its contents are then cooled to a temperature of about $-35°$ C. by the use of solid carbon dioxide or any other convenient means. After the nitro alcohol has been cooled to the proper temperature, liquid ammonia is added preferably in the ratio of approximately 10 moles of ammonia to 1 of nitro alcohol. The bomb is then sealed and the contents thereof agitated at a temperature ranging from about 20 to 85° C., preferably at about 30-40° C. When the absorption of ammonia appears to be complete, hydrogen is introduced into the reaction mixture at a pressure of from about 800 to 2,000 pounds per sq. in. and at a temperature of between about 35 and 75° C. When hydrogen is no longer absorbed, the mixture is allowed to cool and the excess ammonia and hydrogen either vented to the atmosphere or recovered and used in a subsequent run. The contents of the bomb are then filtered to remove the suspended catalyst, after which benzene or a similar water-immiscible substance is added to the filtrate and the resultant mixture distilled at atmospheric pressure to remove the water formed during the reaction, as a constant boiling mixture with benzene. After all of the water has thus been removed, the excess benzene is driven off and the 2-methyl-1,2-propanediamine collected at 123-124° C. in substantially pure form.

One of the particularly outstanding advantages of my process is the fact that I am able to secure this diamine in a substantially anhydrous state, whereas other similar diamines, such as, ethylenediamine form constant boiling mixtures with water and are generally sold as aqueous solutions in which the diamine is present in a concentration of about 65–68%.

An outstanding feature of my invention is the fact that the hydroxyl group of the nitro alcohol is replaced by the $-NH_2$ radical at such relatively low temperatures, i. e., 20–30° C. Normally this reaction does not occur at temperatures appreciably below 150° C.

Any hydrogenation catalyst which is active at the desired operating temperature may be employed in my process. A number of such catalysts are described in "The Hydrogenation of Organic Substances," 3rd edition, 1930, by Carleton Ellis. In general, however, I prefer to employ Raney nickel. This catalyst is particularly advantageous since it is active at temperatures in the neighborhood of 20 to 30° C. Other catalysts such as those of the platinum oxide or palladium-charcoal types also function satisfactorily. The quantity of catalyst to be used is not critical since an excess has no harmful effect and the catalyst ordinarily can be reused for subsequent hydrogenation operations. From 5 to 20%, based on the weight of the nitro alcohol present, will usually be found satisfactory.

My invention may be further illustrated by means of the following specific example:

Example

A mixture consisting of 238 g. of 2-methyl-2-nitro-1-propanol and 11 g. of Raney nickel was placed into a steel hydrogenation bomb after which the contents thereof were cooled to a temperature of around $-35°$ C. by surrounding the bomb with solid carbon dioxide. When the desired temperature was reached, 340 g. of liquid ammonia was added, the bomb sealed, placed in an agitating unit, and the reaction was allowed to proceed at 40° C. until absorption of ammonia was complete. Hydrogen was then introduced at a pressure of approximately 1100 pounds per sq. in. at approximately 40° C. until hydrogen was no longer absorbed. The bomb was then allowed to cool, removed from the agitating unit, and the valve slowly opened to let excess hydrogen and ammonia escape. Thereafter, the bomb liquid was filtered to remove the suspended catalyst and benzene was added to the filtrate, after which this mixture was distilled and the water formed during the hydrogenation removed. When all of the water had been removed in this manner, the excess benzene was distilled off at atmospheric pressure. The residue was then further distilled and the fraction boiling at 123–124° C. and consisting essentially of substantially pure 2-methyl-1,2-propanediamine, was collected. The conversion to 2-methyl-1,2-propanediamine, on the basis of nitro alcohol employed, amounted to 71%.

It is to be understood, of course, that the above example is merely illustrative and does not limit the scope of my invention. As previously pointed out, the catalyst and conditions of operation are not limited to those employed in the foregoing example. In general, it may be said that the use of any such modifications which would naturally occur to those skilled in the art are included within the scope of my invention.

My invention now having been described, what I claim is:

1. In a process for the production of 2-methyl-1,2-propanediamine, the steps which comprise reacting 2-methyl-2-nitro-1-propanol with ammonia under pressure at a temperature of between about 20 and 85° C., then subjecting the resultant mixture to hydrogenation in the presence of a hydrogenation catalyst at elevated temperature and pressure.

2. In a process for the production of 2-methyl-1,2-propanediamine, the steps which comprise reacting 2-methyl-2-nitro-1-propanol with ammonia under pressure at a temperature of between about 20 and 85° C., then subjecting the resultant mixture to hydrogenation in the presence of a hydrogenation catalyst at a temperature of from about 35 to 75° C. and at a pressure of from about 800 to 2000 pounds per sq. in.

3. In a process for the production of 2-methyl-1,2-propanediamine, the steps which comprise reacting 2-methyl-2-nitro-1-propanol with liquid ammonia under pressure at a temperature of between about 30 to 40° C., then subjecting the resultant mixture to hydrogenation in the presence of a hydrogenation catalyst at a temperature of about 40° C. and at a pressure of around 800 to 2000 pounds per sq. in.

4. The process of claim 3 in which the hydrogenation catalyst is Raney nickel.

5. In a process for the production of 2-methyl-1,2-propanediamine, the steps which comprise reacting 2-methyl-2-nitro-1-propanol with liquid ammonia in a ratio of approximately 10 moles of ammonia to 1 of 2-methyl-2-nitro-1-propanol, under pressure at a temperature of between about 30 to 40° C., then subjecting the resultant mixture to hydrogenation in the presence of a hydrogenation catalyst at a temperature of about 40° C. and at a pressure of around 800 to 2000 pounds per sq. in.

HAROLD G. JOHNSON.